United States Patent [19]
Brown et al.

[11] Patent Number: 5,565,218
[45] Date of Patent: Oct. 15, 1996

[54] CENTER SHOT EXTRUSION HEAD FOR COATING WIRE

[76] Inventors: Jearl D. Brown, P.O. Box 42, Dexter, Mo. 63841; Jerry A. Bannister, 1312 McDougal Ave., Sikeston, Mo. 63801

[21] Appl. No.: 582,409

[22] Filed: Jan. 3, 1996

[51] Int. Cl.$^6$ .............................. B29C 47/02; B29C 47/12
[52] U.S. Cl. ................... 425/113; 425/131.1; 425/133.1; 425/186; 425/190; 425/461; 425/467
[58] Field of Search ..................................... 425/113, 114, 425/133.1, 131.1, 190, 461, 467, 186; 264/176.1, 259

[56] References Cited

U.S. PATENT DOCUMENTS

| | | | |
|---|---|---|---|
| 4,165,957 | 8/1979 | Kertscher | 425/113 |
| 4,806,425 | 2/1989 | Chu-Ba . | |
| 5,031,568 | 7/1991 | Milliman | 425/113 |
| 5,183,669 | 2/1993 | Gouillemette | 425/113 |
| 5,316,583 | 5/1994 | Milliman | 425/133.1 |
| 5,332,379 | 7/1994 | Baumgarten | 425/205 |
| 5,468,137 | 11/1995 | Becktel et al. . | |

Primary Examiner—Khanh P. Nguyen
Attorney, Agent, or Firm—Haverstock, Garrett & Roberts

[57] ABSTRACT

An extrusion head includes a housing having a passageway extending therethrough, a portion of the passageway tapered in frusto-conical fashion, an inlet hole extends from the outer surface of the housing into the passageway such that insulating material can flow into the passageway, a first die member is configured to be inserted within the passageway and having a tapered outer surface which engages the tapered portion of the passageway forming a sealed relation therebetween, the first die member includes an opening extending therethrough, an intermediate die member is also configured to be inserted within the passageway and includes an annular groove including a narrow portion and a wider portion, the narrow portion of the groove aligns with the inlet hole when the intermediate die member is inserted within the passageway and allows for substantially uniform flow of the coating material therearound resulting in a substantially uniform and accurate extrusion of the insulating material onto a wire which passes through the extrusion head, a plug member is threaded into the passageway and engages the intermediate die member so as to securely hold it in position.

25 Claims, 3 Drawing Sheets

CENTER SHOT EXTRUSION HEAD FOR COATING WIRE

FIELD OF THE INVENTION

This invention relates generally to devices for applying coating material to wire and more particularly, to extrusion heads for extruding coating material onto the outer surface of wire, and to extrusion heads for extruding nylon onto the outer surface of insulated wire.

BACKGROUND OF THE INVENTION

In the manufacture of wire the thickness of the insulation or other coating surrounding the conductive wire must meet certain requirements or standards such as those set by the Underwriters Laboratories. In the past, methods for coating the outer surface of wire have included extrusion of polymeric materials including nylon and thermoplastics such as polyvinyl chloride (PVC) thereon. However, the extrusion devices utilized have typically been disadvantageously limited in the accuracy and uniformity with which the coating material is extruded onto the surface of the wire. Due to these limitations, it has been necessary to place a greater amount of coating material onto the outer surface of the wire than required by the applicable standards.

For example, if the particular standard requires an insulation thickness of ten thousandths of an inch (0.01 inches) and the accuracy of the extrusion device or extrusion head is only five thousandths of an inch (0.005 inches) then the extrusion device must be configured to extrude an insulating material coating of at least fifteen thousandths of an inch (0.015 inches) in order to assure that the thickness of the insulation of the conductive wire would meet the 0.01 inch standard. Thus, in many cases the actual thickness of the coatings on wire have been greater than required by the applicable standards. In manufacturing terms, the cost of the additional coating material placed on the wire adds up quickly, particularly with respect to the manufacture of wire wherein the speed of the extrusion process, or speed at which such wire is insulated, may far exceed one thousand feet of wire per minute. The cost of the additional coating material can be significant. This background also applies to the extruding of a nylon jacket onto insulated wire.

Further, in known devices for extruding coating material onto conductive wire, additional manufacturing costs are incurred when the extrusion process must be stopped in order to clean the extrusion device or extrusion head. In such known devices the extrusion process can be hindered when the coating material burns within the extrusion head. When such burning occurs, the extrusion process must be stopped so that the extrusion head can be removed and cleaned of all burned material.

Accordingly, it is desirable and advantageous to provide a device for more accurately extruding coating material onto the outer surface of wire in order to reduce material costs. It also is desirable and advantageous to provide a device for extruding coating material onto the outer surface of wire wherein the device requires less cleaning thereby reducing the down time of the extrusion process.

OBJECTS OF THE INVENTION

A principal object of the present invention is to provide an extrusion device for accurately extruding coating material onto the outer surface of a wire.

Another object of the present invention is to provide an extrusion device for accurately extruding nylon onto the outer surface of an insulated wire.

Another object of the present invention is to provide an extrusion device for uniformly extruding coating material onto the outer surface of a wire.

Yet another object of the present invention is to provide an extrusion device which allows less coating material to be extruded onto the outer surface of a wire in order to meet applicable standards as compared to known extrusion devices.

Still another object of the present invention is to provide an extrusion device for extruding coating material onto the outer surface of a wire wherein the extrusion device is configured to reduce the frequency with which the extrusion device must be cleaned as compared to known extrusion devices.

Another object of the present invention is to provide an extrusion device configured to allow substantially smooth and uninterrupted flow of coating material through the extrusion device.

SUMMARY OF THE INVENTION

These and other objects of the invention are attained by an apparatus which, in one embodiment, is an extrusion head configured to allow the coating material to flow freely and substantially uniformly therewithin. The uniform flow of material results in greater uniformity and accuracy in the thickness of the material as it is placed on a wire, allowing less material to be applied while still meeting applicable standards. The free flow of the material within the extrusion head is also advantageous in that it aids in preventing material from remaining in one place, thereby reducing the likelihood that such material will burn onto any portion of the extrusion head.

The extrusion head includes a housing member formed of 440 C stainless steel configured to engage an extrusion machine wherein the coating material, in the form of polymeric materials including nylon and thermoplastics such as PVC, is heated to the desired temperature such that the material flows as necessary. The housing member includes a cylindrical outer surface, a portion of which is cut away to allow engagement with a corresponding block located on the extrusion machine. An inlet hole extends through the surface of the cut away portion of the housing member allowing the coating material to flow into the interior of the housing. Further, a passageway extends from end to end of the housing member and at least a portion of the passageway is tapered in frusto-conical fashion such that the diameter at one end of the passageway is smaller than the diameter at the opposite end of the passageway.

A first die member formed of D-2 metal is configured to fit securely within the passageway at the smaller diameter end thereof. The die member is tapered from end to end such that the outer surface thereof engages the tapered inner surface which defines the passageway of the housing member, the taper along the outer surface of the die member corresponding to the taper of the inner surface of the housing member. The die member is inserted at the larger diameter end of the passageway and pushed toward the smaller diameter end thereof until firm engagement of the outer surface of the die member with the inner surface forming the passageway is made forming a sealed relation therebetween. The die member also includes an opening extending from end to end thereof.

Also configured to fit within the housing member is an intermediate die member formed of D-2 metal. A nose portion of the intermediate die member fits within the opening located in the first die member, the nose portion being slightly smaller in diameter than the opening so as to form an annular gap therebetween. Within the housing member, the outer surface of the intermediate die member includes one or more tapered portions which, in conjunction with the inner surface of the housing member and inner surface of the first die member, form an annular flow path which causes the coating material to flow towards the annular gap formed by the two die members.

Importantly, an annular groove located along the outer surface of the intermediate die member aligns with the inlet hole in the housing member which hole allows the coating material to enter therein. The annular groove is tapered from a first portion located adjacent the inlet hole toward a second, wider portion located approximately one hundred eighty (180) degrees opposite the hole. The width of the groove at the first portion thereof is smaller than the width of the groove at the second portion thereof thereby substantially equalizing the pressure of the coating material around the intermediate die member and allowing the material to flow more uniformly around the outer surface of the intermediate die member and through the annular gap onto the wire. A rear portion of the intermediate die member includes an outer surface which is tapered to engage the inner surface defining the passageway through the housing member, the taper of at least a portion of the outer surface of the intermediate die member corresponding to the taper of the inner surface of the housing member. The intermediate die member is pushed in nose first from the larger diameter end of the passageway until the intermediate die member firmly engages the inner surface of the housing member. Further, when the intermediate die member is inserted within the housing member, the narrow portion of the annular groove is aligned with the inlet hole of the housing member.

The intermediate die member is held in place by a plug member which is formed of A-2 metal and threadedly engages the larger diameter end of the housing passageway. In this regard, the inner surface of the larger diameter end of the passageway includes a portion which is substantially cylindrical and is threaded so as to receive the plug member. As the plug member is threaded into the housing, the end of the plug member engages the end of the intermediate die member so as to hold the intermediate die member in place. The plug member also includes an opening extending therethrough so as to allow the wire to pass therethrough. The end portion of the plug opening is threaded to receive a correspondingly threaded tube which, during the extrusion process, is connected to a vacuum device.

During the extrusion process, a wire is drawn through the plug member, the intermediate die member, and the first die member. At the same time the coating material flows through the inlet hole into the interior of the housing member, along the annular groove and around the intermediate die member towards the annular gap formed by the first and intermediate die members. As the coating material flows out through the annular gap the vacuum created by the vacuum device causes the coating material to be drawn onto the wire.

Advantageously, the uniform flow of coating material around the intermediate die member due to the configuration of the annular groove allows the coating material to flow or extrude evenly out of the annular gap such that the material coats the wire in a substantially uniform and accurate manner. Also, as the coating material flows toward the annular gap the smooth flow path created by the outer surface of the intermediate die member, and the inner surfaces of the first die member and the housing member, allows the coating material to flow freely such that build up and/or burning of the coating material within the flow path is reduced.

Thus, as compared to known extrusion heads, the greater accuracy provided by the extrusion head of the present invention reduces the amount of PVC, nylon, or other coating material which must be applied to the wire in order to meet applicable standards. Further, the smooth flow path of the extrusion head helps reduce the frequency with which the extrusion head must be cleaned thereby reducing the down time of the extrusion process.

DETAILED DESCRIPTION OF THE DRAWINGS

Figure 1:
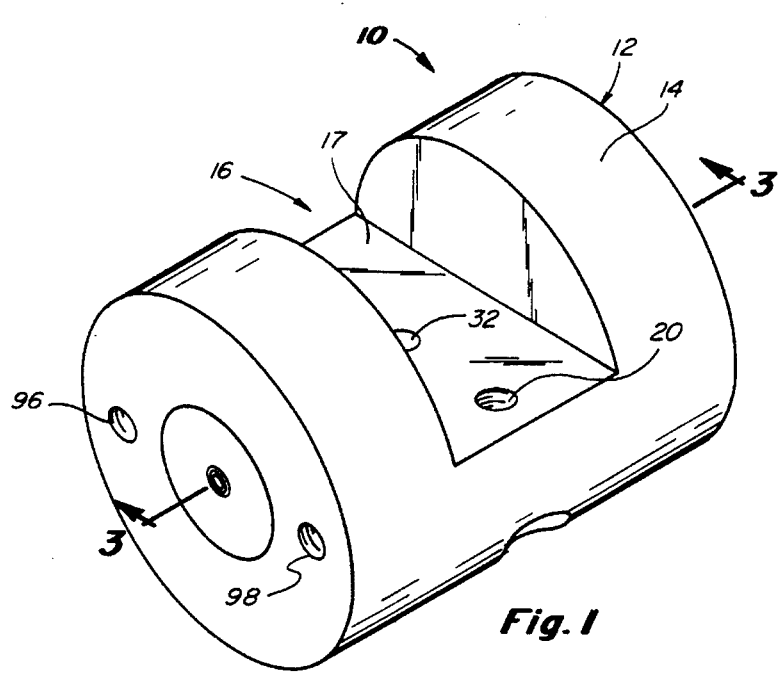
FIG. 1 is a perspective view of an extrusion head constructed in accordance with the present invention.

FIG. 1 illustrates a perspective view of an extrusion head 10 constructed in accordance with the present invention. The extrusion head 10 includes a housing member 12 having a substantially cylindrical outer surface 14, a portion of which is cut out as indicated at 16. The cut out portion 16 is configured to engage an extrusion machine so as to be attached thereto and includes a planar surface 17. In this regard, when the housing member 12 is placed in the extrusion machine, two bolts such as bolt 18, shown in FIG. 2, extend through corresponding holes such as hole 20 and threadedly engage a portion of the extrusion machine so as to secure the housing member 12 thereto.

Figure 2:
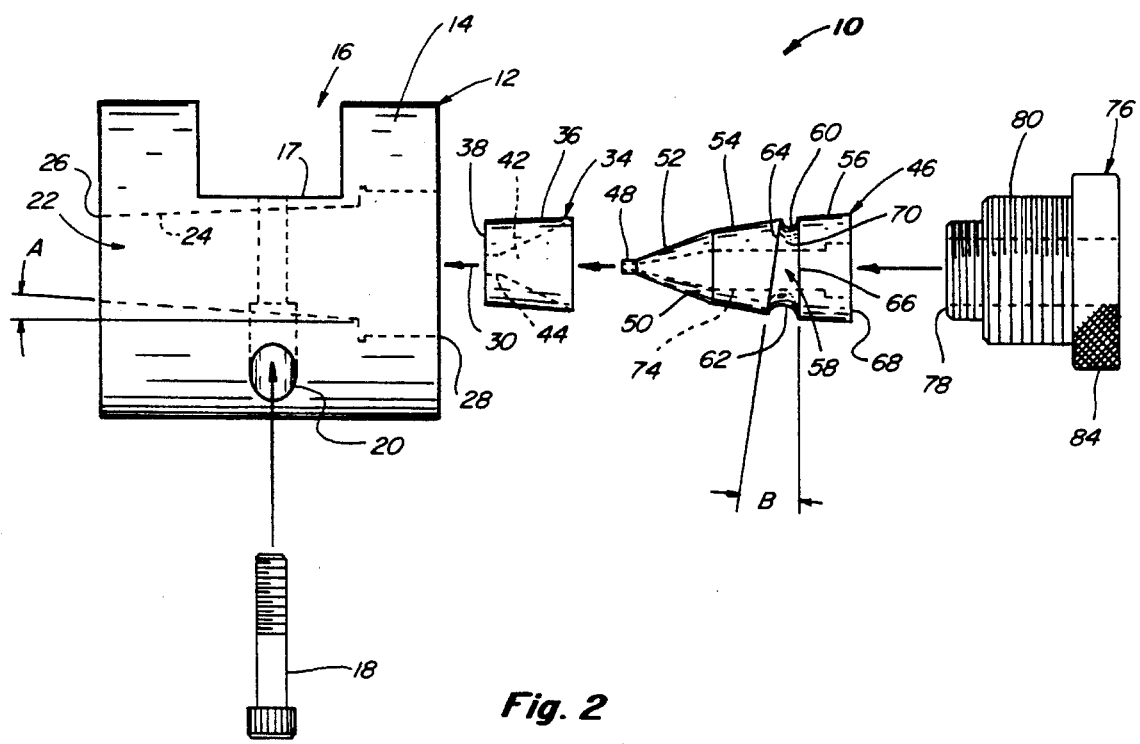
FIG. 2 is an exploded side view of the extrusion head of FIG. 1.
Figure 3:
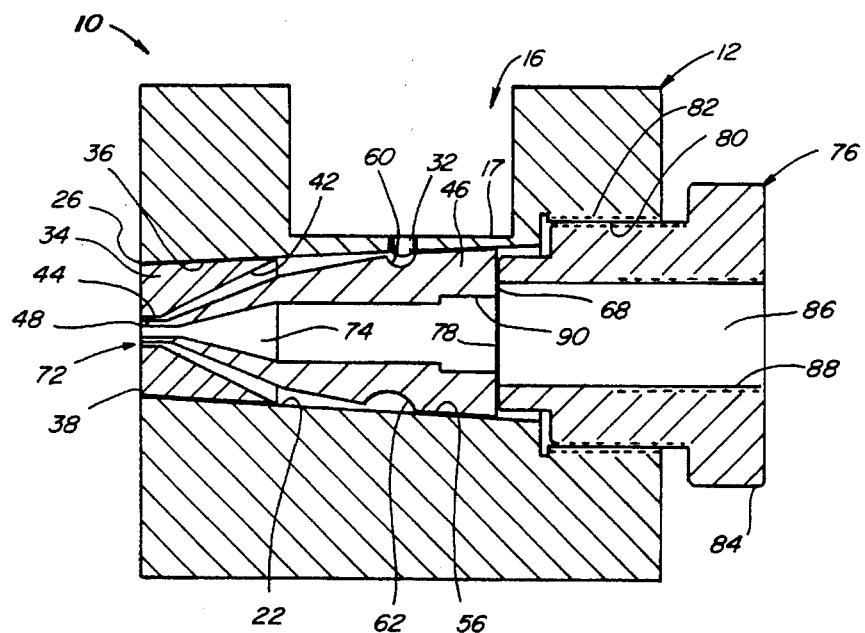
FIG. 3 is a cross-sectional view along line 3—3 of FIG. 1.

A passageway 22, shown in FIG. 2, extends through the housing member 12, at least a portion 24 of the surface forming the passageway 22 being tapered in frusto-conical fashion. A first end 26 of the passageway 22 is smaller in diameter than the opposite end 28 thereof. This larger diameter end 28 allows the remaining portions of the extrusion head 10 to be inserted within the passageway 22 as indicated by the arrow 30. Importantly, the tapered portion 24 of the passageway 22 aids in securing the remaining portions of the extrusion head 10 therewithin as best shown in FIG. 3. With regard to the taper associated with portion 24, an angle A of approximately three degrees is suitable, although other degrees of taper may be utilized without departing from the scope of the invention.

An inlet hole 32 is shown in FIG. 3, which is a cross-sectional view of the assembled extrusion head 10. The inlet hole 32 extends through the planar surface 17 to the passageway 22. When the extrusion head 10 is attached to an extrusion machine, the inlet hole 32 aligns with a source of coating material, such as PVC or nylon, which is heated, and typically under pressure, allowing the material to flow into the passageway 22 of the housing member 12.

Referring to FIG. 2, a first die member 34 is configured to be inserted within the passageway 22 from the larger diameter end 28. The outer surface 36 is tapered from end 38 to end 40 in similar fashion to the tapered portion 24 of the passageway 22. As shown in FIG. 3, when inserted within the passageway 22 the first die member 34 is pushed toward the first end 26 thereof. At this location the outer surface 36 of the first die member 34 engages the tapered portion 24 of the passageway 22, the taper of the outer surface 36 corresponding to the taper of the portion 24. Thus, a secure mating engagement of the first die member 34 within the passageway 22 is achieved and the surface-to-surface contact between the first die member 34 and the portion 24 forms a sealed condition therebetween. The first die member 34 also includes an axially extending opening 42 from end 38 to end 40 thereof at least a portion 44 of which is substantially cylindrical and located substantially adjacent the end 38 which itself is substantially adjacent the first end 26 of the passageway 22.

An intermediate die member 46, shown in FIG. 2, is also configured to fit within the passageway 22. The intermediate die member 46 includes a nose portion 48 and an outer surface 50 having several tapered portions 52, 54, and 56, as well as an annular groove 58. The tapered portion 52 has a higher degree of taper than the portion 54. The annular groove 58 circumscribes the intermediate die member 46 and includes a narrow portion 60 which tapers to a wider portion 62, the wider portion 62 being approximately 180 degrees opposite the narrow portion 60. With regard to the annular groove 58, the width of the portion 60 adjacent the inlet hole 32 is approximately the same as, or slightly larger than, the diameter of the inlet hole 32 while the width of the wider portion 62 is approximately twice that of the first portion 60. First and second sides 64 and 66 define the width of the annular groove 58. The second side 66 runs substantially parallel to the end 68. The first side 64 extends at an angle B with respect to the second side 66 such that as the circumferential distance from the narrow portion 60 increases, the distance between the first side 64 and second side 66 increases. An angle B of approximately eight to nine degrees has been found suitable, although other angles could also be utilized, depending upon the flow characteristics of the coating material utilized, without departing from the scope of the invention. The depth of the annular groove 58 is defined by a curved surface 70 which extends between the first side 64 and the second side 66. The radius of curvature of surface 70 increases as the distance between the first side 64 and the second side 66 increases.

As shown in FIG. 3, the nose portion 48 of the die member 46 is configured to fit within the cylindrical portion 44 of the opening 42 in the first die member 34. The outer diameter of the nose portion 48 is slightly smaller than the inner diameter of the cylindrical portion 44 such that an annular gap 72 is formed therebetween. It is through this annular gap 72 that the PVC, nylon, or other coating material, extrudes onto the wire conductor. The thickness of the coating extruded onto the wire will vary as the size of the annular gap varies. The intermediate die member 46 also includes an opening 74 which extends from the nose portion 48 to the opposite end 68 thereof.

Importantly, when the intermediate die member 46 is inserted within the passageway 22 the narrow portion 60 of the annular groove 58 aligns with the inlet hole 32 of the housing member 12. Thus, the width and area of the annular groove 58 increases as the circumferential distance from the inlet hole 32 increases. This increasing width of the groove 58 creates a substantially uniform resistance to flow of the coating material around the intermediate die member 46 as opposed to a groove which is not tapered. If the width of the groove 58 and corresponding flow area of the material was constant, too much of the coating material, which follows the path of least resistance, would tend to flow out of the narrow portion 60 toward the annular gap 72 rather than around the intermediate die member 46. With the increased width and area of the groove 58, pressure is equalized so that material flowing into the passageway 22 of the housing member 12 flows along the groove 58 from the narrow portion 60 to the wider portion 62, surrounding the intermediate die member 46 in a substantially uniform manner. The coating material then flows toward the nose portion 48 of the intermediate die member 46 and is extruded through the annular gap 72 in a substantially uniform manner. In this regard, the outer surface 50 of the intermediate die member 46, in combination with the inner surfaces of the housing member 12 and the first die member 34 define the flow path of the coating material. The flow path is substantially unobstructed such that the flow of material toward the annular gap 58 is substantially unrestricted. Accordingly, the extrusion through the annular gap 72 is substantially uniform and accurate due to the uniformity of flow within the passageway 22 as described above.

The intermediate die member 46 is held within the passageway 22 by its engagement with the passageway 22 and by a plug member 76, shown in FIG. 2. The intermediate die member 46 is inserted from the larger diameter end 28 of the passageway 22 and pushed therein until the tapered portion 56 engages the passageway 22 as shown in FIG. 3. Further, the intermediate die member 46 is inserted such that the narrow portion 60 of the annular groove 58 aligns with the inlet hole 32. In this regard, the end 68 of the intermediate die member 46 may include a marking which is indicative of the circumferential location of the narrow portion 60 of the annular groove 58 to aid in the circumferential alignment thereof with the inlet hole 32.

One end 78 of the plug member 76 is configured to engage the end 68 of the intermediate die member 46 and at least a portion 80 of the outer surface of the plug member 76 is threaded to engage a corresponding portion 82 of the passageway 22, as seen in FIG. 3. After the intermediate die member 46 has been inserted in the passageway 22, the plug member 76 is then threaded into the passageway until the end 78 thereof engages the intermediate die member 46 so as to securely hold the intermediate die member 46 in position. The outer surface of the exposed end 84 is serrated to facilitate gripping and rotating of the plug member 76. An opening 86 also extends through the plug member 76, a rear portion 88 of the opening being threaded so as to receive a tube or pipe, not shown, which provides a vacuum during the extrusion process to pull the coating material onto the surface of the wire. Further, adjacent the end 68 of the intermediate die member 46 is a portion 90, shown in FIG. 3, having a hex configuration so as to receive an Allen wrench. The Allen wrench may be utilized during assembly of the extrusion head 10 to rotate the intermediate die member 46 in the event that the narrow portion 60 and the inlet hole 32 become misaligned when the plug member 76 is threaded into the housing member 12.

Figure 4:
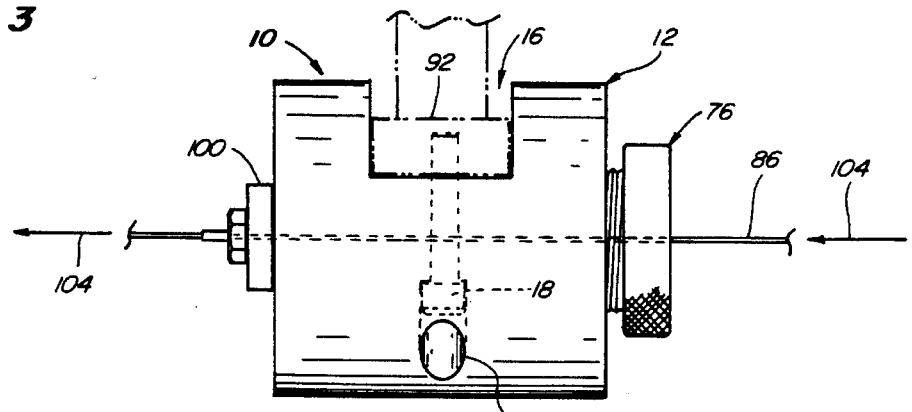
FIG. 4 is a side view of the assembled extrusion head including a wire passing therethrough.
Figure 5:
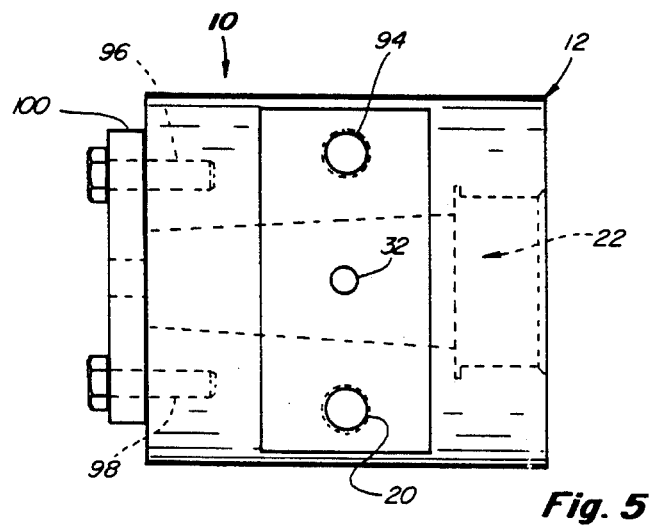
FIG. 5 is a top view of FIG. 4.

Once the extrusion head 10 is assembled it is attached to an extrusion machine via one or more bolts 18 described above with reference to FIG. 2. As shown in FIG. 4, the cut out portion 16 of the housing member 12 slidingly receives a portion 92 of the extrusion machine and the bolts 18 are threaded through holes 20 and 94, shown in FIG. 5, and into the portion 92, securely attaching the extrusion head 10 to the extrusion machine. Also illustrated in FIG. 5 are two drilled and tapped holes 96 and 98 which may be used to secure a pusher block 100 to the housing member 12. This pusher block 100 includes a threaded opening 102 into which a bolt may be threaded so as to engage and push the first and intermediate die members, 34 and 46, from the passageway 22 once the plug member 76 has been removed. During the extrusion process a wire 86 is passed through the extrusion head 10 in the direction indicated by arrows 104 in FIG. 4.

Figure 6:
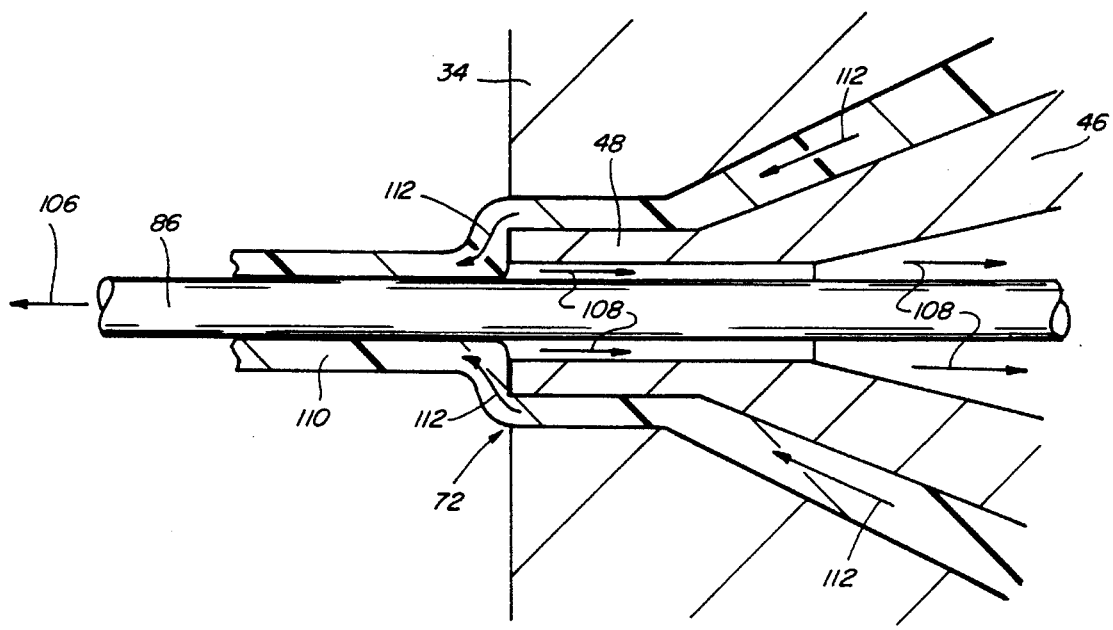
FIG. 6 is an enlarged cross-sectional view of a portion of the extrusion head illustrating the flow of material onto the wire.

With respect to the extrusion process, FIG. 6 is an enlarged cross-sectional view of the nose portion 48 of the intermediate die member 46 inserted within the first die member 34 as extrusion takes place. Arrow 106 indicates the direction of the wire 86 passing through the nose portion 48, arrows 108 indicate the flow direction of the coating material 110, and arrows 112 indicate the direction of the pulling force created by the vacuum during the process. As the wire 86 passes through the nose portion 48, the coating material 110 extrudes out of the annular gap 72. The vacuum within the intermediate die member 46 draws the coating material 110 onto the wire 86 forming a layer of coating material 110 around the entire outer surface of the wire 86. The configuration of the annular groove 58, shown in FIGS. 1 and 2, and the resulting uniform and smooth flow of the coating material 110 result in an advantageously uniform and accurate forming of the coating material 110 layer. A typical extrusion head 10 can be used to coat several sizes of uninsulated wire and can also be used to extrude a coating of nylon onto insulated wire.

Figure 7:
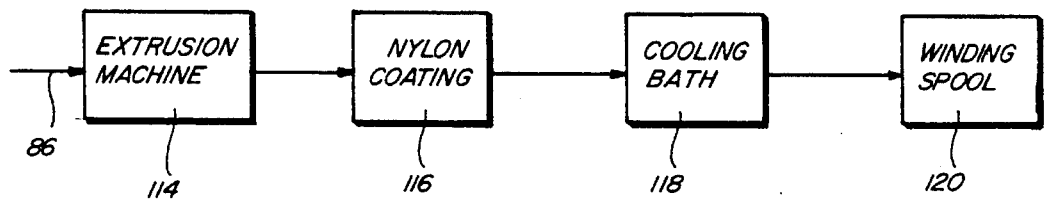
FIG. 7 is a block diagram illustration of possible stations the wire may pass through after the material is extruded thereon.

Once the coating material 110 has been extruded onto the wire 86, the newly coated wire 86 may pass through a number of known steps or stations such as those indicated in FIG. 7. For example, after the extrusion station 114, the wire 86 may pass through a station 116 where a thin nylon film is added. Such a nylon film could be added using the extrusion head 10 of the present invention. The conductor 86 may then pass through a cooling station 118 which could include any number of known cooling methods such as passing the wire 86 through a water bath. Once cooled the conductor 86 can then be wound on a spool at winding station 120. These steps are merely representative of numerous steps or stations through which the wire 86 might pass.

From the preceding description of the illustrated embodiment, it is evident that the objects of the invention are attained. In particular, an extrusion head which allows for substantially accurate and substantially uniform extrusion of material onto the outer surface of a wire has been provided. Further, an extrusion head configured to reduce the down time necessary for cleaning thereof has been provided. Although the invention has been described and illustrated in detail, it is to be clearly understood that the same is intended by way of illustration and example only and is not to be taken by way of limitation.

For example, the configuration of the outer surface of the housing member 12 could vary as necessary to mate with an existing extrusion machine. Also, although the surface of the cut out portion 16 of the housing member 12 is described as a planar surface, such surface may be curved or otherwise non-planar. Further, the degree of taper of or width of the annular groove 58 could be modified depending upon the flow characteristics of the extrusion or coating material used, and the configuration of the curved surface 70 could also vary. Accordingly, the spirit and scope of the invention are to be limited only by the terms of the appended claims.

What is claimed is:

1. An apparatus for coating a wire with a layer of material capable of being extruded comprising:

a housing having a passageway therethrough, at least a portion of the passageway formed by a tapered annular wall, the passageway including a first end and a second end, the first end having a smaller diameter than the second end, an inlet hole extending through the housing into the passageway, and a first member configured to be inserted within the passageway and having an outer surface, a portion of the outer surface engaging the tapered annular wall of the passageway when the first member is inserted therein, the outer surface including an annular groove circumscribing the first member, the annular groove including a first portion and a second portion, the second portion being wider than the first portion, the first portion of the annular groove being aligned with the inlet hole of the housing when the first member is inserted within the passageway.

2. The apparatus of claim 1 wherein a width of the annular groove is defined by a first side and a second side, the width of the annular groove increasing at a fixed rate as the circumferential distance from the first portion of the annular groove increases.

3. The apparatus of claim 2 wherein a curved surface extends between the first and second sides of the annular groove, the curved surface including a varying radius of curvature, the radius of curvature increasing as the circumferential distance from the first portion of the annular groove increases.

4. The apparatus of claim 2 wherein the second portion of the annular groove is located approximately one-hundred eighty degrees circumferentially from the first portion, the width of the second portion being approximately twice the width of the first portion.

5. The apparatus of claim 2 wherein the first member includes first and second ends, the first end being smaller in diameter than the second end, a nose portion being located at the first end thereof, the second side of the annular groove running substantially parallel to the larger diameter end of the first member, the first side of the annular groove being located intermediate the nose portion and the second side.

6. The apparatus of claim 1 wherein a width of the annular groove is defined by a first side and a second side, the width of the annular groove increasing at a variable rate as the circumferential distance from the first portion of the annular groove increases.

7. The apparatus of claim 1 further comprising a second member configured to be inserted within the passageway of the housing, the second member having an outer surface which engages the tapered annular wall of the passageway when inserted therein to form a sealed condition therebetween, one end of the second member being located substantially adjacent the first end of the passageway when inserted therein, an inner surface defining an opening extending axially from end to end of the second member, the first member including a nose portion at one end thereof, the nose portion configured to fit within the opening of the first member so as to form an annular gap therebetween.

8. The apparatus of claim 7 wherein the outer surface of the first member, the inner surface of the second member and the tapered annular wall of the housing define a flow path for the extrudable material such that during an extrusion operation the material flows through the inlet hole, around the annular groove of the first member and toward the annular gap, the material extruding from the annular gap around the wire.

9. The apparatus of claim 7 further comprising a threaded plug member, a portion of the passageway being threaded so as to receive the plug member, the threaded portion of the passageway being located at the larger diameter end thereof, one end of the plug member abutting the first member when threaded into the passageway so as to secure the first member in position, the opposite end of the plug member protruding from the passageway, the plug member including an axially extending opening therethrough.

10. The apparatus of claim 1 wherein the first member includes a marking on the larger diameter end thereof, the marking being indicative of the circumferential location of a predetermined portion of the annular groove.

11. The apparatus of claim 10 wherein the predetermined portion of the annular groove is the first portion of the annular groove.

12. The apparatus of claim 1 wherein at least a portion of the opening of the first member is configured to receive a tool which rotates the first member so that the first portion of the annular groove can be aligned with the inlet hole of the housing.

13. The apparatus of claim 1 wherein the wire is an insulated wire and the extrudable material is nylon.

14. The apparatus of claim 1 wherein the extrudable material is a thermoplastic material.

15. A device for extruding an extrudable material onto the outer surface of a wire comprising:

a housing including a passageway extending axially from end to end allowing the wire to pass therethrough, a first end of the passageway being larger in diameter than an opposite end thereof, an inlet hole extending through the housing into the passageway, a first member configured to be inserted within the passageway such that at least a portion of an outer surface of the first member engages the passageway, the first member including an annular groove having a variable width, the annular groove being axially aligned with the inlet hole of the housing when the first member is inserted within the passageway wherein the annular groove includes a narrow portion which is circumferentially aligned with the inlet hole of the housing when the first member is inserted within the passageway, the width of the annular groove increasing as the circumferential distance from the inlet hole increases.

16. The device of claim 15 wherein a portion of the passageway is defined by a tapered annular surface, at least a portion of the outer surface of the first member being similarly tapered so as to engage the tapered annular surface of the passageway.

17. The device of claim 15 wherein the annular groove includes a first side and a second side, the first side being angled with respect to the second side.

18. The device of claim 17 wherein the annular groove includes a curved surface extending between the first and second sides thereof.

19. The device of claim 15 further comprising a second member configured to be inserted within the passageway, the second member including an axially extending opening, one end of the second member being substantially adjacent the smaller diameter end of the passageway when the second member is inserted therein.

20. The device of claim 19 wherein the first member includes a nose portion, the nose portion being inserted within the opening in the second member so as to form an annular gap therebetween.

21. The device of claim 15 further comprising a plug member configured to be inserted within the larger diameter end of the passageway, one end of the plug member engaging the first member when the plug member is so inserted.

22. The device of claim 15 wherein the extrudable material is a polymeric material.

23. An apparatus for extruding an extrudable material onto a wire member as the wire moves therethrough comprising:

a housing having an axially extending passageway therethrough, one end of the passageway having a smaller diameter than the opposite end, at least a portion of the passageway formed by a tapered annular wall, an inlet hole extending through the housing into the passageway and located at an intermediate location therealong, first and second members positioned in the passageway, each of said first and second members having an axially extending passageway therethrough, the first member sealably engaging the tapered annular wall, the second member having an outer annular surface a portion of which is configured for engaging the tapered annular wall of the passageway so that the second member is spaced from the first member and so that one end of the second member is positioned relative to the first member so as to form an annular gap therebetween, the second member having an annular groove extending therearound, the groove having a relatively narrow portion adjacent the inlet hole and a relatively wide portion positioned approximately one-hundred eighty degrees circumferentially therefrom.

24. The apparatus of claim 23 wherein width and depth dimensions of the annular groove are selected to equalize the pressure on the extrudable material as it flows around the second member.

25. The apparatus of claim 23 further comprising a third member threadedly engaging the passageway and having an end surface abutting the second member to retain the second member within the passageway.

* * * * *